United States Patent
Champagne et al.

(10) Patent No.: US 8,171,494 B2
(45) Date of Patent: May 1, 2012

(54) PROVIDING IDENTITY TO A PORTAL WITH A REDIRECT

(75) Inventors: Jean-Philippe Champagne, Raleigh, NC (US); Richard Manfred Pruss, Tewantin (AU); Earl Hardin Booth, III, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 986 days.

(21) Appl. No.: 11/951,161

(22) Filed: Dec. 5, 2007

(65) Prior Publication Data
US 2009/0150904 A1 Jun. 11, 2009

(51) Int. Cl.
*G06F 13/00* (2006.01)
(52) U.S. Cl. .......................... 719/313; 709/230; 709/238
(58) Field of Classification Search .................. 719/313; 709/230, 238
See application file for complete search history.

(56) References Cited

U.S. PATENT DOCUMENTS

| | | | |
|---|---|---|---|
| 6,976,085 B1 | 12/2005 | Aviani et al. | |
| 6,983,332 B1 | 1/2006 | Lou et al. | |
| 2004/0088349 A1* | 5/2004 | Beck et al. | 709/203 |
| 2009/0034536 A1* | 2/2009 | Morand et al. | 370/400 |

* cited by examiner

*Primary Examiner* — Andy Ho
(74) *Attorney, Agent, or Firm* — Schwegman, Lundberg & Woessner, P.A.

(57) ABSTRACT

In an example embodiment, a method is provided to receive a request message. A client that transmitted the request message then is identified. Here, the client is associated with a client identifier. The client identifier is inserted into a response message, and this response message includes a redirect to a portal. The response message then is transmitted.

20 Claims, 8 Drawing Sheets

PROVIDING IDENTITY TO A PORTAL WITH A REDIRECT

FIELD

The present disclosure relates generally to computer networks. In an example embodiment, the disclosure relates to providing identity to a portal with a redirect.

BACKGROUND

Generally, Port Address Translation (PAT) is a feature of a network device (e.g., router) that translates network communications. In particular, Port Address Translation may operate on a router to connect two networks together. One of these networks is addressed with either private or obsolete addresses that need to be converted into legal addresses before packets are forwarded onto the other network. Port Address Translation can be used in firewall systems to hide addresses of clients or in multi-port broadband network access devices (e.g., Digital Subscriber Line, routers, cable modems, and other network access devices) such that a single address can be used by many clients on a network.

Port Address Translation uses a port-bundle host key (PBHK) to uniquely identify each client associated with a host. To derive the port-bundle host key, a portal may use the source port of an incoming Hypertext Transport Protocol (HTTP) message and apply a complex formula to the HTTP message from the source port. The encoding/decoding to derive the port-bundle host key must be done for every packet. Accordingly, such encoding/decoding operations for all packets are computationally intensive and therefore, make a network system difficult to scale.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

OVERVIEW

A method is provided to receive a request message. A client that transmitted the request message then is identified. Here, the client is associated with a client identifier. The client identifier is inserted into a response message, and this response message includes a redirect to a portal. The response message then is transmitted.

EXAMPLE EMBODIMENTS

Figure 1:
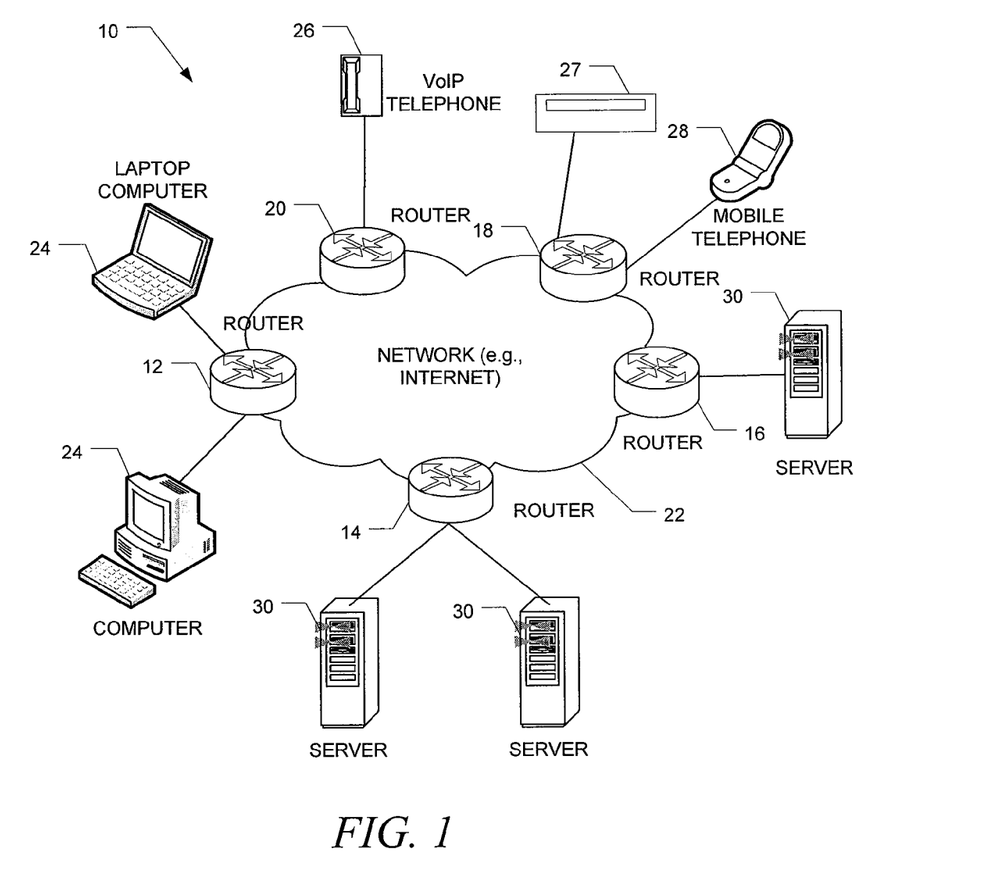
FIG. 1 is a diagram of a networked system, in accordance with an example embodiment.

FIG. 1 is a diagram of a networked system, in accordance with an example embodiment. Example system 10 includes various network endpoints (e.g., network nodes) and network devices, and data is communicated between the various network endpoints and network devices. In the example system 10, network endpoints may include routers 12, 14, 16, 18 and 20. However, it will be appreciated that any number of routers 12-20 may be provided in system 10. Routers 12-20 are shown to be connected via a network which may include one or more Local Area Networks (LANs) and/or Wide Area Networks (WANs), such as the Internet. System 10 also includes network devices including, for example, servers 30 and clients such as computers 24, Voice-over-IP (VoIP) telephone 26, cable box 27, and mobile telephone 28.

In the example system 10, data is communicated by way of Internet Protocol (IP) packets or datagrams using a variety of suitable communication protocols. For example, packets may be encapsulated and communicated using the Hypertext Transfer Protocol (HTTP). Further, although system 10 is shown to include routers 12-20, it should be noted that the example embodiments described herein are equally applicable to other network devices, such as switches or the like. Broadly, the example embodiments described herein may be deployed in a variety of network devices that receive digital data for processing and communication to other network devices.

Figure 2:
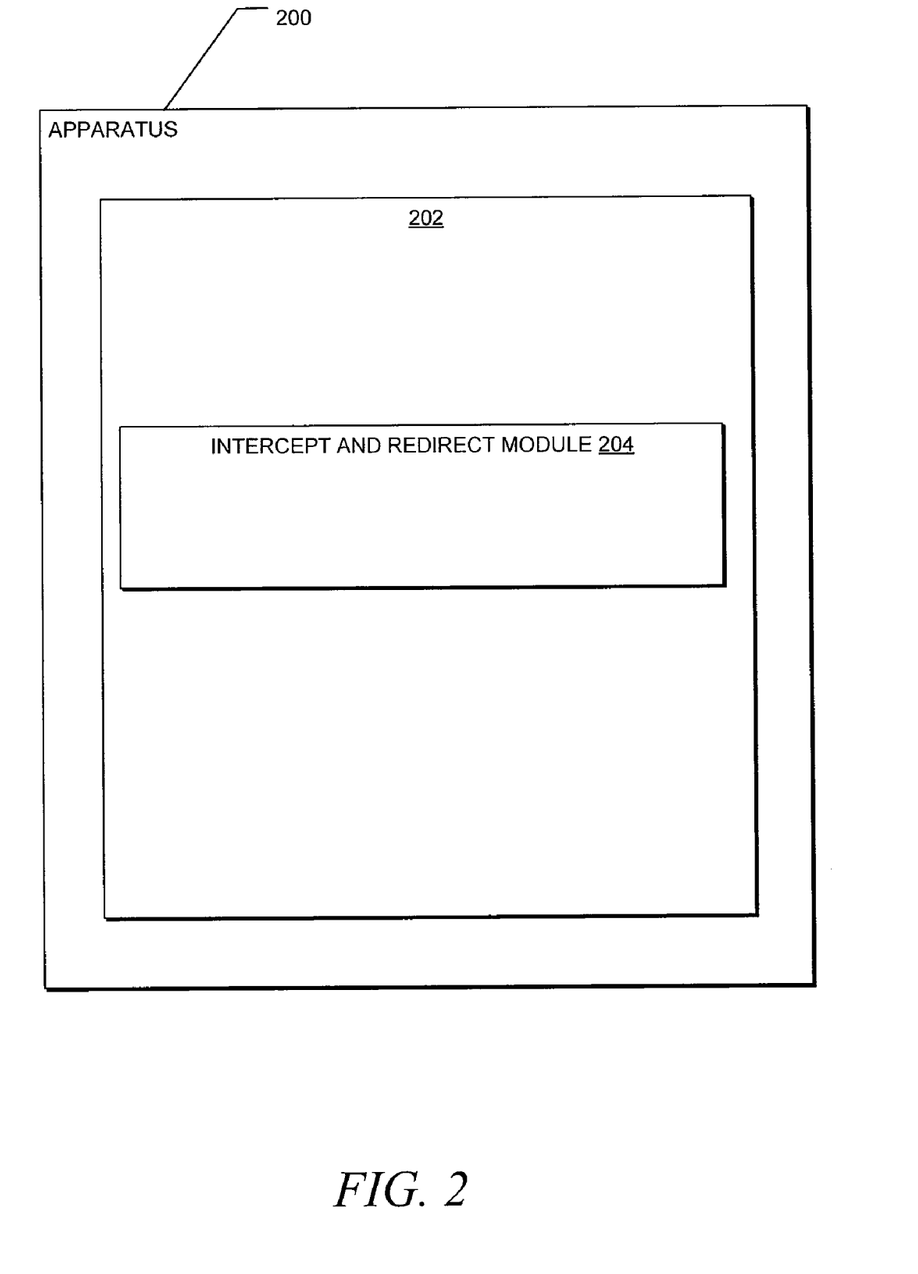
FIG. 2 is a simplified block diagram of a module included in an apparatus, in accordance with an example embodiment.

FIG. 2 is a simplified block diagram of a module included in an apparatus, in accordance with an example embodiment. Apparatus 200 includes operating system 202 (e.g., an Internetworking Operating System) that manages the software processes and/or services executing on the apparatus. As shown in FIG. 2, these software processes and/or services may include intercept and redirect module 204. It should be appreciated that apparatus 200 may be deployed in the form of a variety of network devices that receive data for communication to other network devices, such as routers or the like. For example, apparatus 200 may form a part of one of the routers depicted in FIG. 1. Returning to FIG. 2, in various example embodiments, apparatus 200 may be used to implement computer programs, logic, applications, methods, processes, or other software to identify a client to a portal, as described in more detail below.

In brief, intercept and redirect module 204 can receive or intercept one or more request messages and redirect the HTTP messages to a portal. As explained in more detail below, intercept and redirect module 202 can identify a client (or subscriber) that transmitted the request message and insert an identifier that identifies the client (client identifier) into the redirect. A portal that receives the redirected request message with the client identifier may therefore extract the client identifier to identify the client associated with the session. It should be appreciated that in other example embodiments, apparatus 200 may include fewer or more modules apart from those shown in FIG. 2. For example, intercept and redirect module 204 may be separated into an intercept module that intercepts request messages and a redirect module that generates the redirect.

Figure 3:
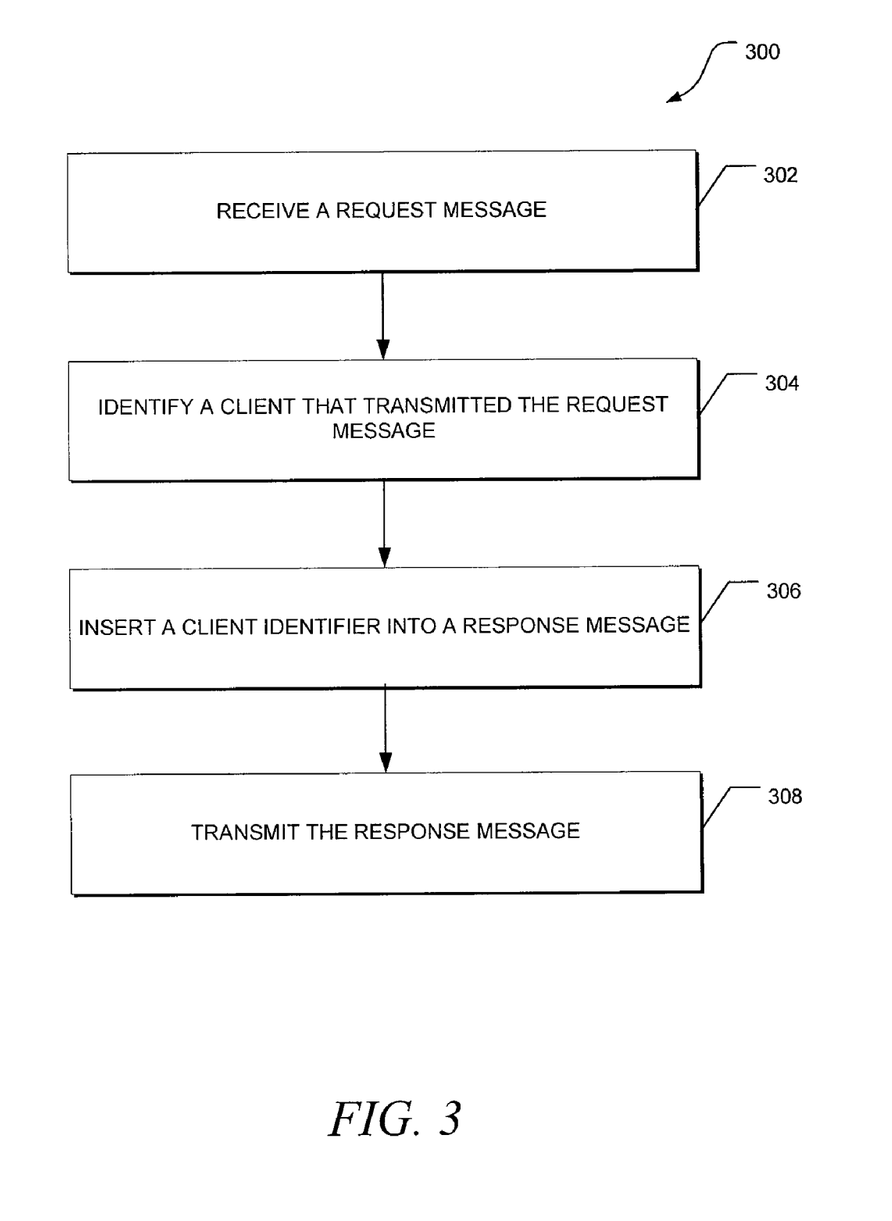
FIG. 3 is a flow diagram of a general overview of a method, in accordance with an example embodiment, for providing the identity of a client to a portal.

FIG. 3 is a flow diagram of a general overview of a method, in accordance with an example embodiment, for providing the identity of a client to a portal. In an example embodiment, method 300 may be implemented by intercept and redirect module 204 of FIG. 2, employed in an apparatus, such as routers 12, 14, 16, 18, and 20 of FIG. 1. As shown in FIG. 3, in an example embodiment, a request message is received at 302. The request message is a request that is transmitted from a client to a server to apply a method to a resource located on the server. As explained in more detail below, the request message may be directed to the server or to a router that is configured to forward the request message to the server. The request message may be associated with a variety of protocols. An example of a request message (or type of request message) includes a Hypertext Transfer Protocol (HTTP) GET request, which requests a representation of a resource. Another example of a request message is an HTTP POST request, which submits data to be processed by a resource. Other examples of request messages include an HTTP HEAD request, an HTTP PUT request, and other request messages. It should be appreciated that a resource that is accessed by a request message is identified using a Uniform Resource Locator (URL) or Uniform Resource Identifier (URI). Generally, the URL identifies a resource and includes information to access the resource. This URL is included in the request message.

After the request message is received, the client that transmitted the request message is identified at 304. As explained in more detail below, in an example embodiment, the client may be identified from information stored in the request message. In another example embodiment, the client may be identified from an interface that received the request message. With the client identified, a response message is generated and a client identifier is inserted into the response message at 306. A client identifier is information that identifies or refers to a particular client. Each client may be associated with a unique identifier. For example, the client identifier may be a unique alphanumeric key value. In another example, the client identifier may be the internal record index for a client. Here, the internal record index is used internally within routers and portals and, for example, is not shared with other network devices.

In addition to the client identifier, the response message also includes a redirect to a portal. The redirect is a response that induces a client to link to another location. For example, the redirect may be an HTTP response with a status code beginning with three (e.g., 302) and includes the URL of the portal. A portal can include a variety of network gateways that provide access to other applications and/or resources. An example of a portal is a Web portal that functions as a point of access to information on the World Wide Web. Other portals may include, for example, business-to-business portals, domain specific portals, and other portals. Thereafter, at 308, the response message is transmitted back to the client that transmitted the request message in response to the request message received.

Figure 4:
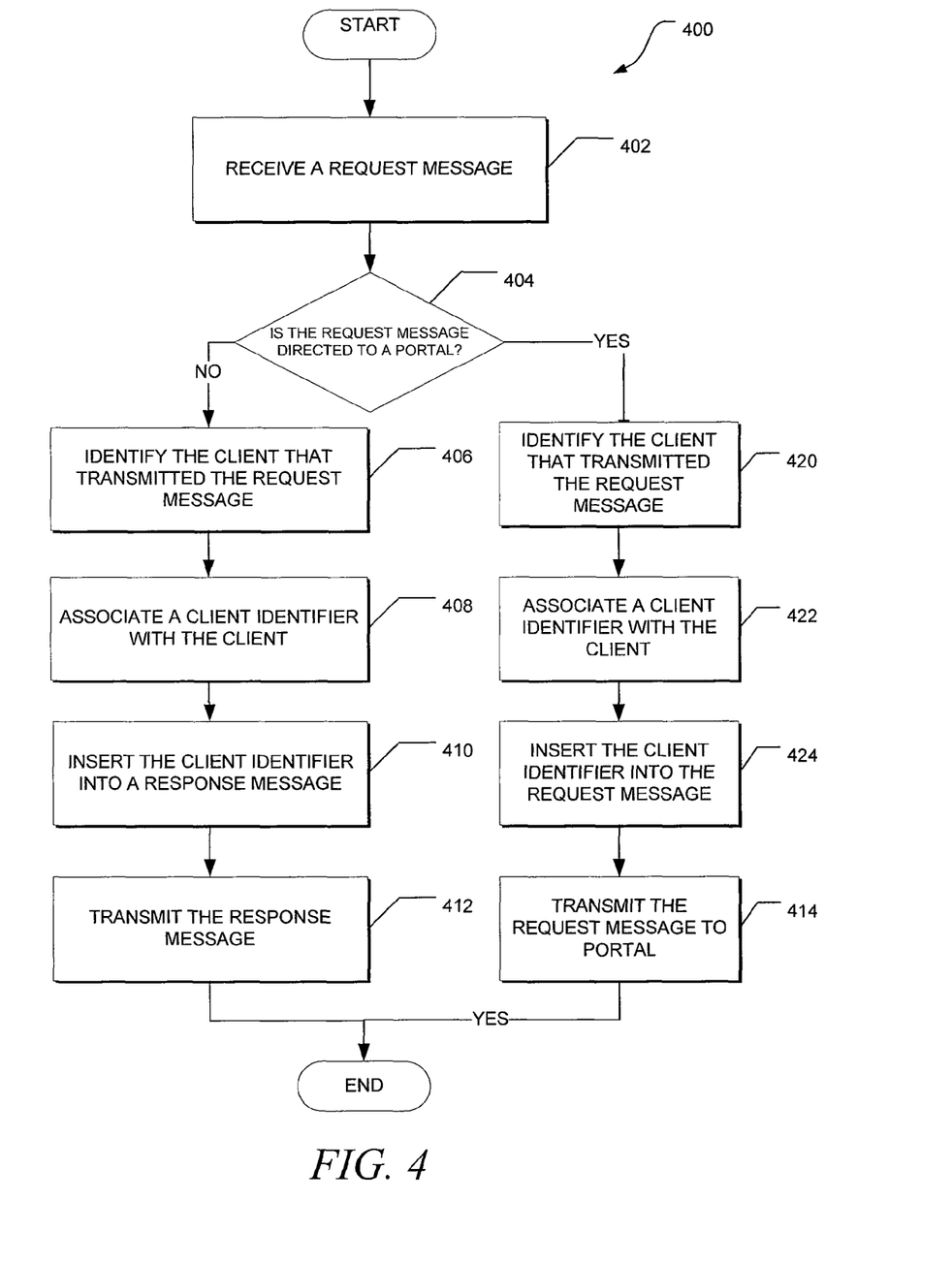
FIG. 4 is a flow diagram of detailed operations, in accordance with an example embodiment, for providing the identity of a client to a portal.

FIG. 4 is a flow diagram of detailed operations, in accordance with an example embodiment, for providing the identity of a client to a portal. In an example embodiment, method 400 may be implemented by intercept and redirect module 204 of FIG. 2, employed in an apparatus, such as routers 12, 14, 16, 18, and 20 of FIG. 1. As shown in FIG. 4, at 402, a request message is received from a client. It should be noted that the intended recipient of the request message may be the server or a network device, such as a router, that forwards the request message to the server. For example, the request message includes a destination Internet Protocol (IP) address. The destination IP address may be the IP address of the server or of a router.

If the apparatus is configured to redirect request messages to a portal, then the apparatus analyzes the received request message at 404 to determine whether the received request message is directed to a portal. If the request message is not directed to a portal, then the client that transmitted the request message is identified at 406. The client may be identified by a variety of network connection information. For example, it should be appreciated that the request message includes a source Internet Protocol (IP) address. The source IP address is the address of the source (e.g., client) that originated the request message. Accordingly, in an example embodiment, the client may be identified by reading the source IP address included within the request message. Alternatively, in another example embodiment, the client may be identified by the interface of the apparatus that received the request message. Here, the apparatus may include a number of interfaces (e.g., line cards). One or more ports can be assigned to each interface. In turn, the ports are assigned to particular clients. Each interface is configured to receive data from or transmit data to a particular client. As a result, the client may be identified by identifying the particular interface that received the request message.

With the client identified, a client identifier is associated with the client at 408. For example, client identifiers may be stored in a variety of data structures (e.g., arrays, tables, and other data structures) within the apparatus. Once the client that transmitted the request message is identified, the client identifier that is associated with the client is identified within the data structure and assigned to the client. At 410, the client identifier then is inserted into a response message. Additionally, in other example embodiment, other information (e.g., user identification, user password, and other information) may also be inserted into the response message. It should be noted that, in response to the request message, a response message is generated. As discussed above, the response message includes a redirect to a portal.

It should be appreciated that the client identifier may be inserted into various portions within the response message. In an example embodiment, the client identifier may be inserted into the Uniform Resource Locator (URL) included within the response message. The response message includes a redirect to a portal and the redirect includes a URL that identifies the location of the portal. The URL may include a query component that includes non-hierarchical data that serves to identify a resource within the scope of the URL's scheme and naming authority (if any). The query component is indicated by the first question mark ("?") character and terminated by a number sign ("#") character or by the end of the URL. For example, the query component of the URL http://rportal.com/welcome.html?queryvalue1 includes a query value of "queryvalue1." In an example embodiment, the client identifier may be inserted in the query component of the URL, which may be after the question mark character. Accordingly, the example of URL above may be rewritten as http://rportal.com/welcome.html?id=ClientIdentifier with the client identifier inserted in the query component of the URL. In addition, the URL may also include an anchor component (or fragment component). The anchor component is separated from the rest of the URL reference by a # (number sign) character. In another example embodiment, the client identifier may be inserted in the anchor component.

Alternatively, in another example embodiment, the client identifier may be inserted in a cookie header line of the response message. Here, in general, client identifiers are provided to a portal with the use of cookies. When the portal receives the response message with the client identifier inserted into the cookie header line, the portal updates the cookie file with the client identifier. After the client identifier is inserted into the response message, the response message is transmitted to the client at 412 in response to the receipt of the request message.

Still referring to FIG. 4, on the other hand, if the request message is directed to a portal, then the client that transmitted the request message may be identified at 420. With the client identified, a client identifier is associated with the client at 422. In an example embodiment, the client identifier may then be inserted into the request message at 424 and the request message is transmitted to or forwarded to the portal at 414. For example, a request message "http://www.portal.com/" is received and the client identifier "id=294929" is inserted into the HTTP request message to create "http://www.portal.com?id=294929." Alternatively, in another example embodiment, another response message may be generated. This response message also includes a redirect to the portal even though the received request message is directed to the portal. The client identifier may be inserted into this response message and the response message is transmitted back to the client. As a result, upon receipt of the response message, the client is redirected to or again directed to the same portal.

Figure 5:
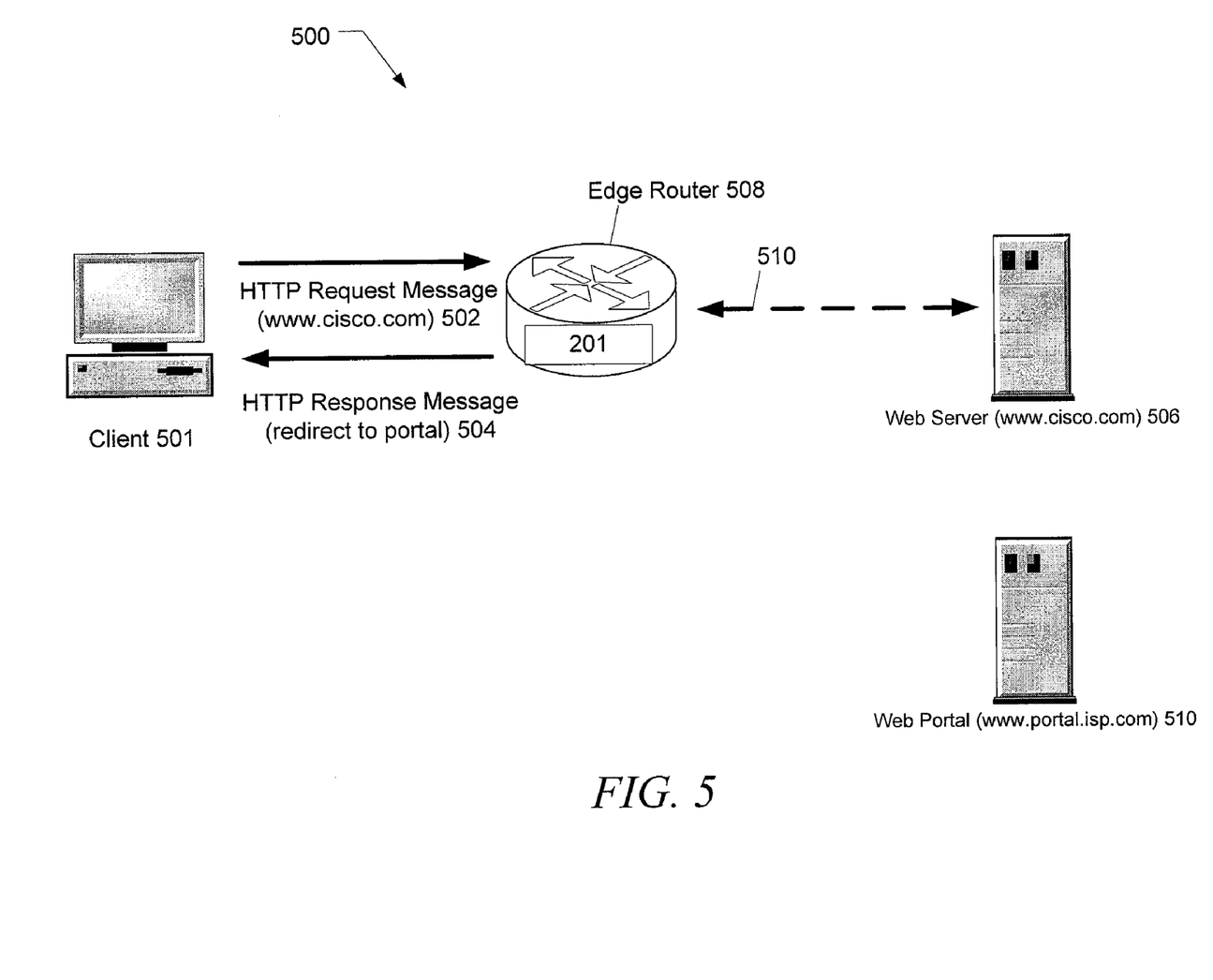
FIG. 5 is a simplified block diagram of a system, in accordance with an example embodiment, for intercepting and redirecting HTTP request messages to a portal.

FIG. 5 is a simplified block diagram of a system, in accordance with an example embodiment, for intercepting and redirecting HTTP request messages to a portal. System 500 includes client 501, edge router 508, Web server 506, and Web portal 510, which are connected together in a network. Generally, edge router 508 is a router that interconnects different domains. A domain is a collection of nodes (e.g., routers) under the control of one or more entities that present a common routing policy. Here, intercept and redirect module 201 is hosted on edge router 508. Web server 506 is configured to accept HTTP request messages from client 501 and to serve HTTP responses. In this example, the URL www.cisco.com is mapped to Web server 506. Web portal 510 is configured to serve as a gateway to the World Wide Web and, in the example of FIG. 5, is mapped to www.portal.isp.com.

As shown in FIG. 5, client 501 initially sends HTTP request message 502 to Web server 506. In this example, HTTP request message 502 is a GET request for a Web page located on Web server 506 and the HTTP request message includes the URL "www.cisco.com" used to locate the Web server. Edge router 508 (or intercept and redirect module 201) receives HTTP request message 502 and, in an example embodiment, identifies client 501 by reading the source IP address included in the HTTP request message. With client 501 identified, a client identifier is associated with the client. In particular, the internal record index is used as the client identifier. The source IP address of client 501 corresponds to an internal record index of "2332028." As such, client identifier of "2332028" is associated with client 501.

Edge router 508 then generates HTTP response message 504 in reply or response to HTTP request message 502. HTTP response message 504 includes a redirect to Web portal 510. The client identifier "2332028" also is inserted into query component of HTTP response message 504. An example of such an HTTP response message 504 may be an HTTP 302 redirect with URL http://www.portal.isp.com:8081?id=2332028&orig=www.cisco.com. It should be appreciated that the client identifier or other information within the URL may be concealed for security. For example, the client identifier may be replaced with irrelevant data to mask the client identifier. Here, the query component may be padded with "999999999999999999." As explained in more detail below, edge router 508 can replace the padding with the query component (e.g., client identifier and/or other information) upon a redirect to Web portal 510.

Still referring to FIG. 5, edge router 508 then transmits HTTP response message 504 to client 501. Client 501 receives HTTP response message 504 and believes that HTTP request message 502 was actually transmitted to Web server 506 and the Web server transmitted the HTTP response message as a response. The dotted line arrow 510 illustrates this false link. In actuality, edge router 508 intercepted TCP communication between client 501 and Web server 506. Here, edge router 508 is configured to imitate Web server 506 by replying to HTTP request message 502. It should be noted that a TCP connection is still maintained between client 501 and Web server 506. In order not to break the TCP connection, the TCP synchronization (SYN), acknowledgment and synchronization (SYN-ACK), and acknowledgment (ACK) between client 501 and the Web server 506 remains unchanged.

Figure 6:
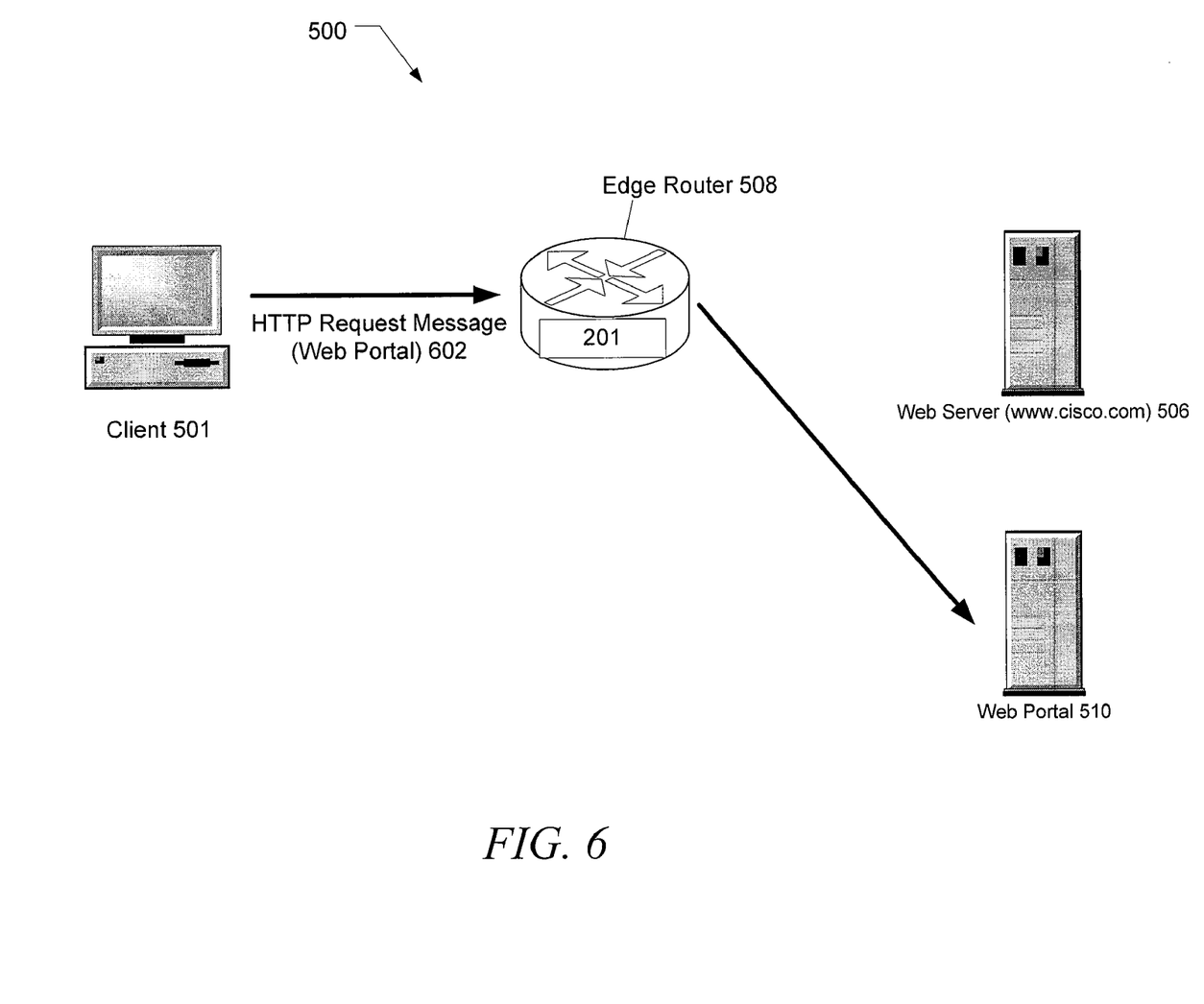
FIG. 6 is a simplified block diagram of a system, in accordance with an example embodiment, for responding to a redirect.

FIG. 6 is a simplified block diagram of a system, in accordance with an example embodiment, for responding to a redirect. Here, client 501 receives an HTTP response message with a redirect and a client identifier. In response, client 501 terminates Transmission Control Protocol (TCP) connection with Web server 506 and establishes a connection with Web portal 510. In particular, client 501 transmits a second HTTP request message 602 to Web portal 510. An example of HTTP request message 602 may include HTTP Get http://www.portal.isp.com:8081?id=2332028&orig=www.cisco.com.

Edge router 508 receives HTTP request message 602 and analyzes the HTTP request message to determine whether the HTTP request message is directed to a portal. Here, HTTP request message 602 is directed to Web portal 510. As a result, instead of intercepting HTTP request message 602 and inserting yet another redirect, edge router 508 forwards or transmits the HTTP request message to Web portal 510. Alternatively, if edge router 508 has information before receipt of HTTP request message 602 that the HTTP request message is to be redirected, the edge router can terminate the TCP connection between client 501 and Web server 506 and can redirect HTTP request message 602 to Web portal 510.

If the query component or another portion of HTTP request message 602 is padded for security, then edge router 508 may replace the padding with the actual query component (e.g. client identifier and/or other information). In an example, the query component of HTTP request message 602 is padded with irrelevant data. Edge router 508 can replace the irrelevant data with the actual client identifier. Edge router 508 can replace the padding because the padding originated from this edge router. Accordingly, the padding along with its client identifier is stored in edge router 508, which enables the edge router to replace the padding with the client identifier.

Web portal 510 receives HTTP request message 602 from edge router 508. The client identifier is included in HTTP request message 602. Web portal 510 can therefore extract the client identifier from HTTP request message 602. As a result, the HTTP redirection provides an identification of the client to Web portal 510.

Figure 7:
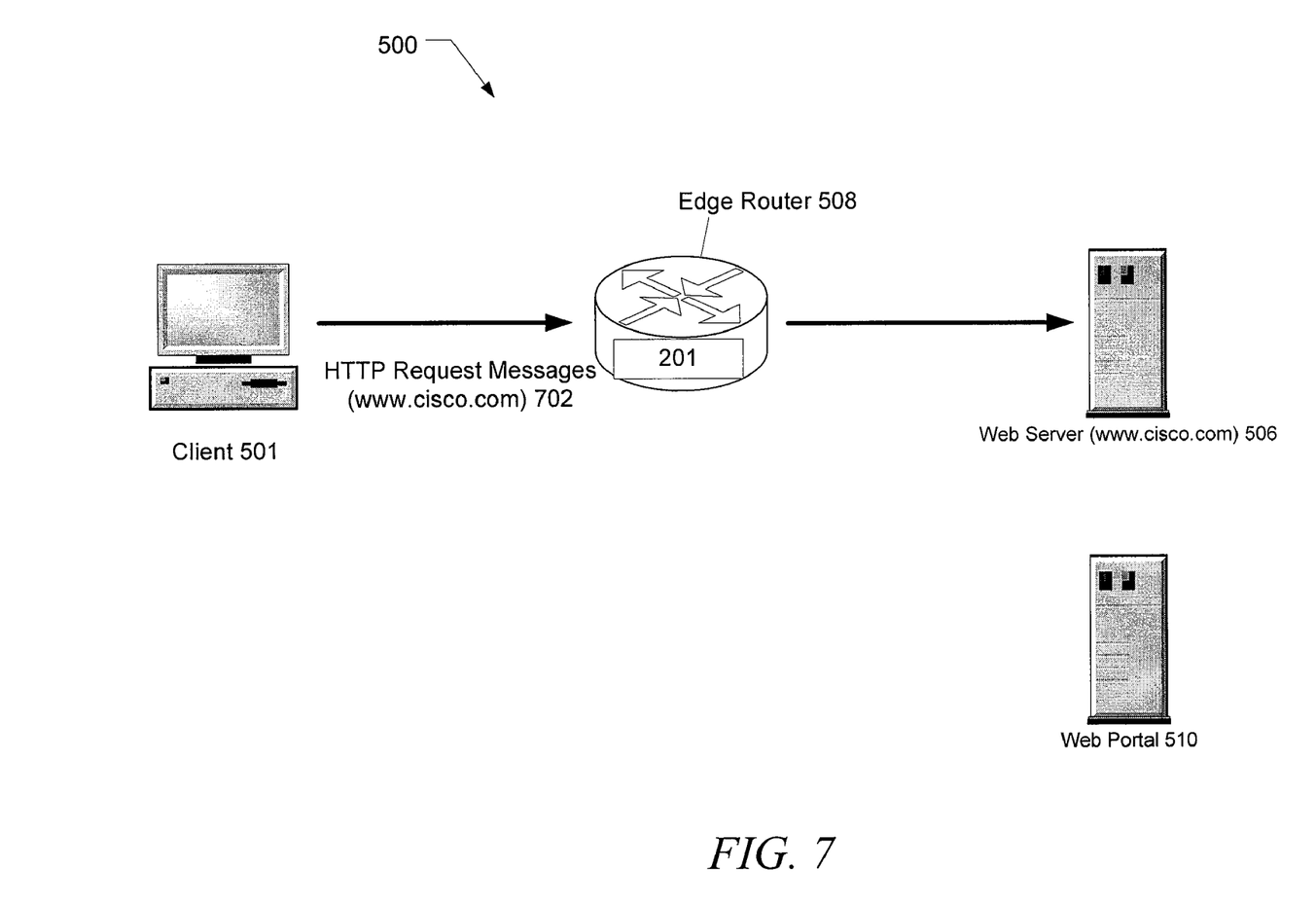
FIG. 7 is a simplified block diagram of a system, in accordance with an example embodiment, for handing subsequent HTTP request messages.

FIG. 7 is a simplified block diagram of a system, in accordance with an example embodiment, for handing subsequent HTTP request messages. Here, the identity of client 501 (or client identifier) is provided to Web portal 510. For example, as discussed above, Web portal 510 may receive the client identifier from a redirect of an HTTP request message that originated from edge router 508. As a result, Web portal 510 may simply receive the client identifier without further calculations to derive the client identifier.

With receipt of client identifier, Web portal 510 may continue to receive redirects from edge router 508 until the Web portal notifies the edge router to end or terminate the redirect. As shown in FIG. 7, with edge router 508 notified to end the redirect, subsequent HTTP request messages 702 to Web server 506 from client 501 is transmitted to or forwarded to the Web server.

Figure 8:
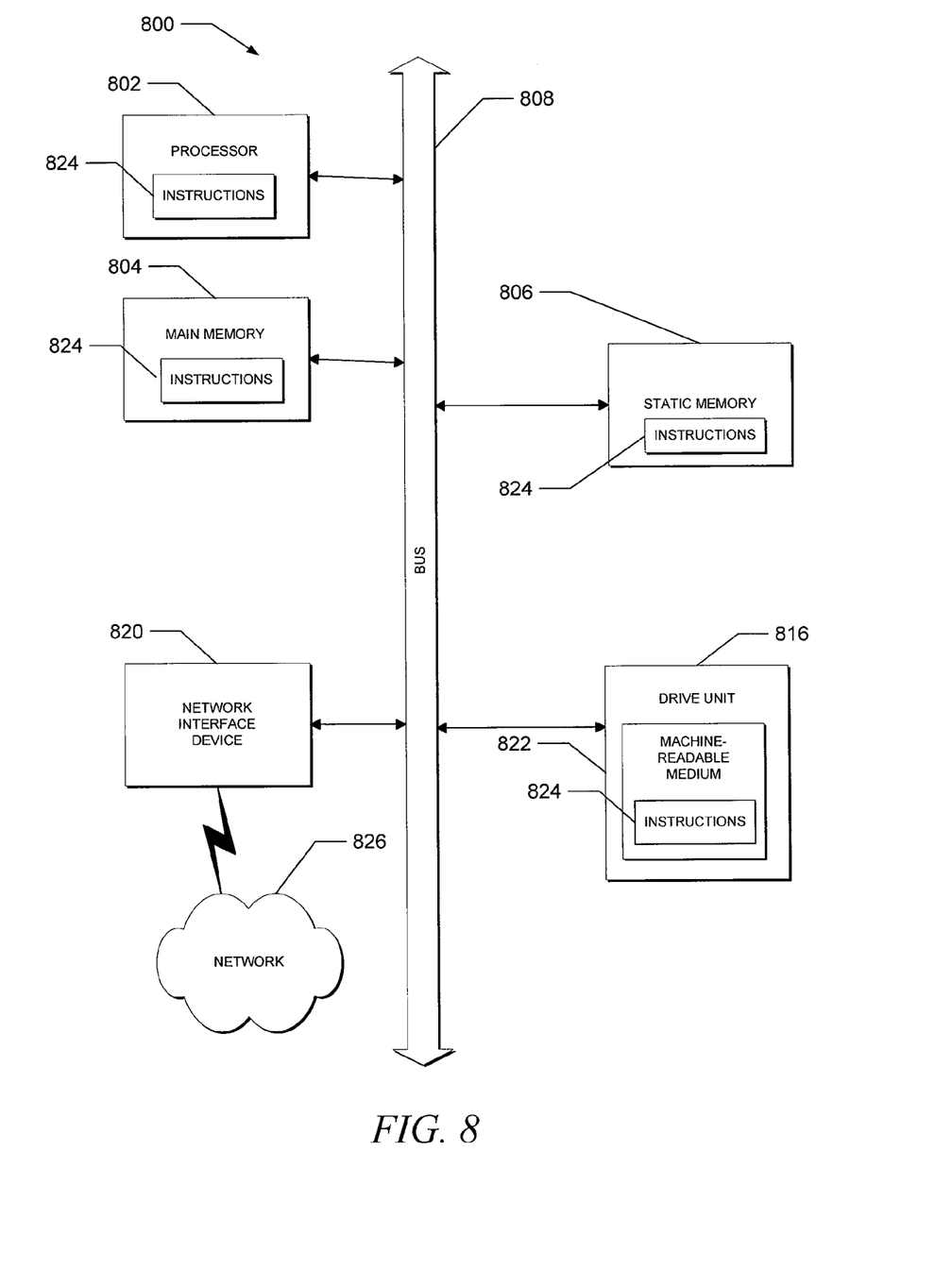
FIG. 8 is a simplified block diagram of a machine in the example form of a computing system within which a set of instructions, for causing the machine to perform any one or more of the methodologies discussed herein, may be executed.

FIG. 8 is a simplified block diagram of a machine in the example form of a computing system within which a set of instructions, for causing the machine to perform any one or more of the methodologies discussed herein, may be executed. In alternative embodiments, the machine may be connected (e.g., networked) to other machines. The machine may be a network router (e.g., label switch router), switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 800 includes processor 802 (e.g., a central processing unit (CPU)), main memory 804 and static memory 806, which communicate with each other via bus 808. Computing system 800 may also include disk drive unit 816 and network interface device 820.

Disk drive unit 816 includes machine-readable medium 822 on which is stored one or more sets of instructions and data structures (e.g., software 824) embodying or utilized by any one or more of the methodologies or functions described herein. Software 824 may also reside, completely or at least partially, within main memory 804 and/or within processor 802 during execution thereof by computing system 800, with main memory 804 and processor 802 also constituting machine-readable, tangible media. Software 824 may further be transmitted or received over network 826 via network interface device 820 utilizing any one of a number of well-known transfer protocols (e.g., Hypertext Transfer Protocol (HTTP)).

While machine-readable medium 822 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving a request message directed to a network device;
   identifying a client that transmitted the request message, the client being associated with a client identifier;
   inserting the client identifier into a response message, the response message including a redirect to a portal, the redirect being configured to redirect the client from the network device to the portal; and
   transmitting the response message.

2. The method of claim 1, further comprising associating the client identifier with the client.

3. The method of claim 1, wherein the identifying the client comprises reading a source Internet Protocol (IP) address associated with the request message.

4. The method of claim 1, wherein the identifying the client comprises identifying an interface that received the request message, the interface being associated with the client.

5. The method of claim 1, wherein the response message includes a Uniform Resource Locator (URL), the inserting the client identifier further comprises inserting the client identifier in the URL.

6. The method of claim 5, wherein the client identifier is inserted in a query component of the URL.

7. The method of claim 1, wherein the inserting the client identifier comprises inserting the client identifier in a cookie header line of the response message.

8. The method of claim 1, wherein the request message is a Hypertext Transfer Protocol (HTTP) GET request.

9. An apparatus comprising:
   a memory configured to store a message intercept and redirect module; and
   a processor in communication with the memory, the processor being configured to execute the intercept and redirect module, the intercept and redirect module to:
   receive a request message directed to a network device;
   identify a client that transmitted the request message, the client being associated with a client identifier;
   insert the client identifier into a response message, the response message including a redirect to a portal, the redirect being configured to redirect the client from the network device to the portal; and
   transmit the response message.

10. The apparatus of claim 9, wherein the intercept and redirect module to further associate the client identifier with the client.

11. The apparatus of claim 9, wherein the intercept and redirect module to further read a source Internet Protocol (IP) address associated with the request message.

12. The apparatus of claim 9, wherein the intercept and redirect module to further identify an interface that received the request message, the interface being associated with the client.

13. The apparatus of claim 9, wherein the response message includes a Uniform Resource Locator (URL), and wherein the intercept and redirect module to further insert the client identifier in an anchor component of the URL.

14. The apparatus of claim 9, wherein the intercept and redirect module to further insert the client identifier in a cookie header line of the response message.

15. Logic encoded in one or more tangible media for execution and when executed operable to:
 receive a request message directed to a network device;
 identify a client that transmitted the request message, the client being associated with a client identifier;
 insert the client identifier into a response message, the response message including a redirect to a portal, the redirect being configured to redirect the client from the network device to the portal; and
 transmit the response message.

16. The logic of claim 15, further operable to associate the client identifier with the client.

17. The logic of claim 15, wherein the response message includes a Uniform Resource Locator (URL), the operable to insert the client identifier to further insert the client identifier in an anchor component of the URL.

18. The logic of claim 15, wherein the operable to insert the client identifier to further insert the client identifier in a cookie header line of the response message.

19. An apparatus comprising:
 an intercept and redirect module
  to receive a request message directed to a network device, and
  to identify a client that transmitted the request message, the client being associated with a client identifier; and
 a means for inserting the client identifier into a response message, the response message including a redirect to a portal, the redirect being configured to redirect the client from the network device to the portal.

20. The apparatus of claim 19, wherein the intercept and redirect module to further transmit the response message to the client.

\* \* \* \* \*